United States Patent [19]

Salisbury

[11] 4,252,403
[45] Feb. 24, 1981

[54] COUPLER FOR A GRADED INDEX FIBER

[75] Inventor: Glenn C. Salisbury, Roanoke, Va.

[73] Assignee: International Telephone and Telegraph Corporation, New York, N.Y.

[21] Appl. No.: 91,913

[22] Filed: Nov. 6, 1979

[51] Int. Cl.³ .................................................. G02B 5/14
[52] U.S. Cl. .............................. 350/96.15; 350/96.31; 350/96.33
[58] Field of Search ............... 350/96.15, 96.18, 96.20, 350/96.21, 96.30, 96.31, 96.33; 250/199, 227; 65/4 B

[56] References Cited

U.S. PATENT DOCUMENTS

| | | | |
|---|---|---|---|
| 4,000,416 | 12/1976 | Goell | 250/199 |
| 4,140,505 | 2/1979 | Ramsay et al. | 350/96.15 X |
| 4,149,772 | 4/1979 | Iyengar et al. | 350/96.33 |
| 4,201,447 | 5/1980 | Thompson et al. | 350/96.31 |

FOREIGN PATENT DOCUMENTS 52-27644  3/1977  Japan ..................... 350/96.31

OTHER PUBLICATIONS

"Fiber Optic Developments", *Electronics*, vol. 49, No. 16, Aug. 1976, pp. 96–101.

*Primary Examiner*—Conrad J. Clark
*Assistant Examiner*—John D. Lee
*Attorney, Agent, or Firm*—John T. O'Halloran; Peter C. Van Der Sluys

[57] ABSTRACT

A concentric core fiber having a low numerical aperture has an end face aligned with the end face of a graded index fiber having a high numerical aperture. The inner core of the concentric core fiber is aligned with and faces the central region of the graded index fiber, while the outer core of the concentric core fiber is aligned with the outer periphery of the inner core of the graded index fiber. In this manner, low order modes which propagate in the inner core of the concentric core fiber are coupled to the central region of the graded index fiber. Higher order modes which propagate in the outer core of the concentric core fiber are applied to the inner core of the graded index fiber and propagate at the edges thereof.

10 Claims, 3 Drawing Figures

COUPLER FOR A GRADED INDEX FIBER

BACKGROUND OF THE INVENTION

This invention relates to optical couplers and more particularly to an optical coupler for a graded index fiber.

The graded index fiber has been in existence for a number of years and has a core with a refractive index profile that is radially symmetric. The refractive index profile of the core is approximately parabolic in shape being highest at the center of the core and descreasing parabolically until it matches the cladding refractive index at the core clad interface. Light which is propagated into the core of any fiber and therefore a graded index fiber at an angle less than the critical acceptance angle (numerical aperture NA) is reflected internally upon striking the core-clad interface and therefore continues to propagate within the fiber core. Graded index fibers minimize propagation delay between various modes and therefore can handle large bandwidths as compared to step index fibers.

In any event, it has been a problem in the prior art to apply high and low order modes to a graded index fiber with small crosstalk. Essentially, as indicated, a graded index fiber can handle a large number of modes. Since both the high and low order modes are internally reflected within the fiber, they will interfere with each other and produce crosstalk or coupling between the two modes.

It is therefore an object of the present invention to excite high and low order modes within a graded index fiber, while further providing a relatively insignificant amount of crosstalk.

BRIEF DESCRIPTION OF PREFERRED EMBODIMENT

An optical coupler comprising a graded index fiber having a given numerical aperture, said fiber having an annular cross section comprising an inner light conducting core of a given diameter surrounded by an annular concentric cladding layer, which layer is in turn surrounded by an annular substrate layer, said fiber having an end face of said cross section, a concentric core fiber having a numerical aperture less than said given numerical aperture, said fiber having an annular cross section comprising an inner light conducting core of a diameter less than said given diameter, surrounded by an annular isolation zone of a predetermined width, which in turn is surrounded by an outer light conducting core of another width wherein the overall diameter of said outer core as surrounding said isolation zone surrounding said inner core is relatively equal to said given diameter of said core of said graded index fiber, said concentric fiber having an end face containing said cross section in congruent alignment with the end face of said graded index fiber to cause low order modes propagating in said inner core of said concentric fiber to couple to a central portion of said inner core of said graded fiber, and to cause high order modes propagating in said outer core of said concentric fiber to propagate at the peripheral edges of said inner core of said graded index fiber.

DETAILED DESCRIPTION OF THE INVENTION

Figure 1:
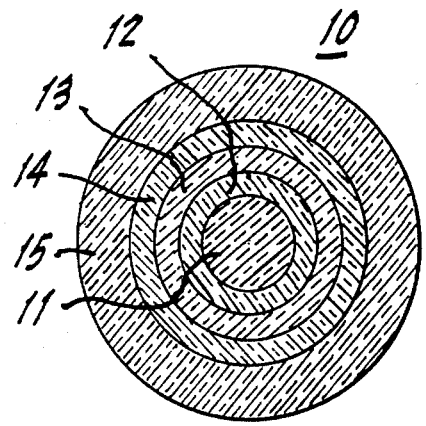
FIG. 1 is a front plan view of a concentric core fiber.

Referring to FIG. 1, there is shown a front view of a concentric core fiber 10. Essentially, the concentric core fiber 10 has a cross section which consists of a series of annular rings. The concentric core fiber has an inner core 11 which is fabricated from a high quality glass such as a fused silica glass or a glass containing germania, phosphor, boron and silica.

The inner core 11 is surrounded by an annular ring 12 fabricated from a relatively dark borosilicate glass. Concentric with the ring 12 is an outer core 13 which like the inner core, also functions to propagate light. An outer cladding layer 14 is provided about the outer core 13. The cladding layer 14 is in turn surrounded by an outer substrate layer 15.

The concentric core fiber as 10 has been provided by ITT Electro-Optical Products Division, Roanoke, Virginia and essentially enables one to propagate different information on the inner core 11 and the outer core 13. The layer 12 serves as an isolation zone to prevent light propagating in the inner core 11 from being coupled to the outer core 13. The concentric core enables increased information capability to be employed in optical communication systems.

Figure 2:
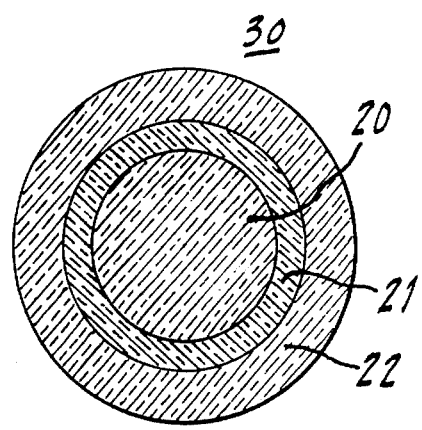
FIG. 2 is a front plan view of a graded index fiber.

Referring to FIG. 2, there is shown a front view of a graded index fiber. The graded index fiber also has an annular cross sectional configuration and consists of an inner core 20 which is fabricated from a low loss silica glass. The inner core 20 is surrounded by a cladding layer 21 which in turn is surrounded by an annular substrate layer 22. The functions and techniques of fabricating graded index fibers are well known in the state of the art and many examples exist.

Figure 3:
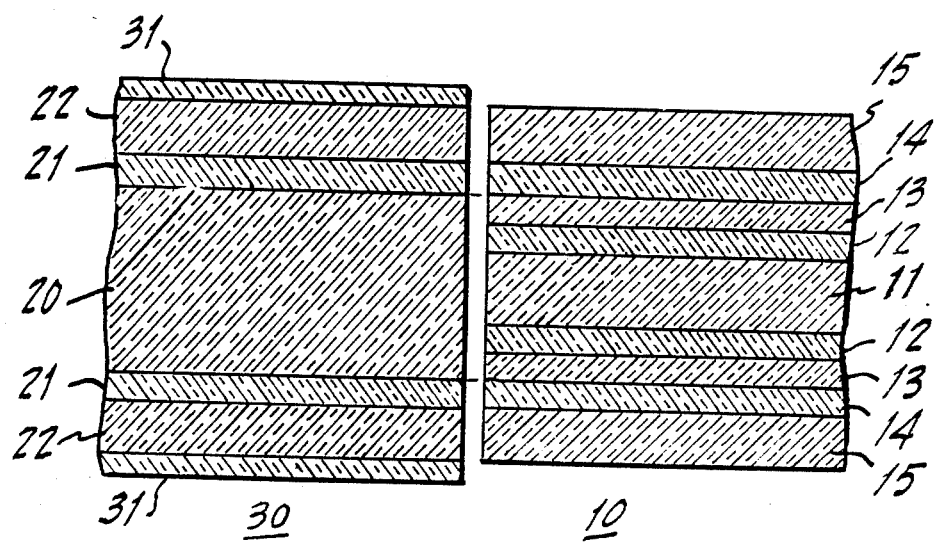
FIG. 3 is a side cross sectional view of a concentric core fiber aligned with a graded index fiber to provide a coupling apparatus according to this invention.

Referring to FIG. 3, there is shown at the right a concentric core fiber 10 having a front face juxtaposed or in alignment with a front face of a graded index fiber 30. For the sake of simplicity, similar numerals have been employed to designate similar functioning parts.

The concentric core fiber 10 has a cross sectional configuration as shown in the Figure. The concentric core fiber is selected to have a low numerical aperture or a numerical aperture of about 0.05. A low numerical aperture indicates that light propagating in such a cable has a low cone angle and hence, tends to stay at the center of the inner core 11. The graded index fiber 30 is selected to have a high numerical aperture as between 0.25 to 0.30 and graded index fibers with such numerical apertures are commercially available.

As indicated in FIG. 3, the concentric core fiber 10 is positioned with its end face held in contact or close proximity with the face of the graded index fiber 30, which fiber 30 has a numerical aperture of at least five times or greater than the numerical aperture of fiber 10.

As can be seen from FIG. 3, the inner core 11 of the concentric core fiber 10 faces the central region of the core 20 of the graded index fiber 30. The outer core 13 of the concentric core fiber faces and is congruent with the outer periphery of the inner core 20 of the graded index fiber.

The fibers 10 and 30 are held together in this manner by means of a suitable splice or connection. There are many techniques employed in the prior art for splicing cables together. It is known that the most critical parameter which is referred to as axial or lateral alignment is provided for by many different splicing techniques. For examples of suitable techniques, reference is made to an article entitled "Fiber Optic Developments" in Electronics, Vol. 49, No. 16 (Aug. 5, 1976), a McGraw-Hill publication on pages 96-101.

Essentially, if the fibers 10 and 30 are positioned as shown and spliced, the outer core 13 of the concentric fiber 10 will launch only high order modes. The inner core 11 of the concentric fiber 10 due to the fact that it has a low numerical aperture will launch only low order modes. In this manner, the low order modes propagated by the inner core 11 will couple to the inner core 20 of the graded index fiber 30 relatively at the center region. The high order modes which are propagated by the outer core 13 will couple at the peripheral edges of the core 20 of the graded index fiber. Light propagating at the edges travels down the fiber as a sine wave. The high order modes which propagate at the edges of the graded index fiber are internally reflected back and forth via the length of the fiber off the cladding layer 21 and hence, will cross the low order mode which is propagating at the center of the fiber. However, there will be no mixing or interfering between the high and the low order modes. The graded index fiber is fabricated so that it has a very uniform refractive index profile which can be closely controlled and such fibers are formed from glass preforms of high quality, which glass contains germania, phosphor, boron and silica.

Referring to FIG. 3, there is further shown a jacket 31 surrounding the graded index fiber 30. The jacket 31 is fabricated from a silicon RTV coating and hence, is very rugged and durable. The outer jacket 31 limits the amount that the cable 30 can bend and hence, cable 30 will not undergo severe bending. It is necessary to maintain cable 30 relatively rigid in order to prevent discontinuities in the cable which will cause the high and low modes to couple.

Since the inner core 11 of the concentric fiber 10 launches low order modes and the outer core launches high order modes, different information can be propagated in the garded index fiber as coupled to the concentric core fiber. This enables one to employ the graded index fiber in high band width applications. The concentric core fiber is used to couple different information to a graded index fiber and to assure that the information will not be mixed and hence, eliminates cross coupling between the optical information conveyed by the high order mode with the optical information conveyed by the low order mode.

As is understood, the main aspect of this invention is to employ a concentric core fiber having a low numerical aperture with a graded index fiber having a high numerical aperture to hence, assure selective propagation of a low and a high order mode with a minimum of interference between the modes.

As one can ascertain, the above described operation is a reversible one and hence, high order modes propagating at the edges of the fiber 30 will couple to the outer core 13 of the concentric core fiber, while low order modes propagating at the center of the fiber 20 will propagate and hence, couple to the inner core 11 of the concentric fiber.

As by way of example, the inner core of the concentric fiber 11 is about 30 microns with the isolation zone 12 being about 30 microns in width as is the width of the outer core 13. Thus, the inner core 20 of the optical fiber 30 is about 150 microns. Various other dimensions can be accommodated as will be understood by those skilled in the art.

I claim:
1. An optical coupler, comprising:
a graded index fiber having a given numerical aperture, said fiber having an annular cross section comprising an inner light conducting core of a given diameter surrounded by an annular concentric cladding layer, which layer is in turn surrounded by an annular substrate layer, said fiber having an end face of said cross section,
a concentric core fiber having a numerical aperture less than said given numerical aperture, said fiber having an annular cross section comprising an inner light conducting core of a diameter less than said given diameter, surrounded by an annular isolation zone of a predetermined width, which in turn is surrounded by an outer light conducting core of another width, wherein the overall diameter of said outer core as surrounding said isolation zone surrounding said inner core is relatively equal to said given diameter of said core of said graded index fiber, said concentric fiber having an end face containing said cross section in congruent alignment with the end face of said graded index fiber to cause low order modes propagating in said inner core of said concentric fiber to couple to a central portion of said inner core of said graded fiber, and to cause high order modes propagating in said outer core of said concentric fiber to propagate at the peripheral edges of said inner core of said graded index fiber.

2. The optical coupler according to claim 1 wherein said numerical aperture of said graded index fiber is selected to be between 0.25 to 0.30. to 0.30.

3. The optical coupler according to claim 1 wherein said numerical aperture of said concentric core fiber is at least five times less than said numerical aperture of said graded index fiber.

4. The optical coupler according to claim 3 wherein said numerical aperture of said concentric core fiber is between 0.05 and 0.06.

5. The optical coupler according to claim 1 wherein said graded index fiber further includes an elastomeric annular layer surrounding said substrate layer to restrain excessive bending of said graded index fiber.

6. The optical coupler according to claim 1 wherein said inner core of said graded index fiber is fabricated from a glass containing germania, silica, boron and phosphor.

7. The optical coupler according to claim 1 wherein said annular isolation zone is fabricated from a borosilicate glass.

8. The optical coupler according to claim 1 wherein the diameter of said inner core of said concentric fiber is about 30 microns.

9. The optical coupler according to claim 8 wherein the diameter of said inner core of said graded index fiber is about 150 microns.

10. The optical coupler according to claim 1 wherein the width of said outer core of said concentric fiber is about 30 microns.

* * * * *